United States Patent [19]

Bendig, Jr.

[11] Patent Number: 4,875,649
[45] Date of Patent: Oct. 24, 1989

[54] SUPPORT STAND

[76] Inventor: Robert Bendig, Jr., 425 Merrimac, No. D-103, Costa Mesa, Calif. 92626

[21] Appl. No.: 220,173

[22] Filed: Jul. 18, 1988

[51] Int. Cl.4 .............................................. A47G 23/02
[52] U.S. Cl. ..................................... 248/153; 248/175
[58] Field of Search ............... 248/153, 154, 152, 175, 248/27.8, DIG. 8; 47/39, 41 R, 41.2, 41.11, 44; 108/157; D11/164, 52

[56] References Cited

U.S. PATENT DOCUMENTS

| | | |
|---|---|---|
| D. 229,575 | 12/1973 | Dallas . |
| 1,001,416 | 8/1911 | Lloyd . |
| 1,006,328 | 10/1911 | Widenhofer . |
| 1,897,905 | 2/1933 | Johnson .......................... D11/164 X |
| 2,399,498 | 8/1944 | Messick . |
| 3,013,758 | 10/1959 | Smith . |
| 3,784,044 | 1/1974 | Bruggeman et al. . |
| 3,863,875 | 2/1975 | Olson . |
| 4,025,012 | 5/1977 | Chan et al. . |
| 4,083,457 | 4/1978 | Dromboski . |
| 4,215,514 | 8/1980 | Horowitz . |
| 4,534,130 | 8/1985 | Rogers . |
| 4,623,113 | 11/1986 | Studebaker . |

Primary Examiner—Ramon O. Ramirez
Attorney, Agent, or Firm—Leonard Tachner

[57] ABSTRACT

A support stand comprises two bent rigid wires joined at about their centers to form a spider-like configuration having an elevated surface suitable for supporting a potted plant and having four legs each of which, particularly when thinly plated with zinc, copper, cadmium or alloys thereof, tend to resist snails and other such annoying pests that would otherwise climb to the potted plant and damage or destroy it.

7 Claims, 1 Drawing Sheet

SUPPORT STAND

BACKGROUND OF THE INVENTION

1. Field of the Invention

This invention relates generally to support stands such as may be used for supporting objects such as a potted plant for display elevated above an underlying surface and more specifically to a rigid wired support stand which is a simple and low cost structure and provides a stable surface upon which to mount potted plants and the like.

2. Prior Art

While the present invention can be used to support virtually any device having a size, shape and weight within a preselected range, the invention finds particularly advantageous use for supporting potted plants. Potted plants have become increasingly popular as a simple and inexpensive way to bring beauty, life and color into an environment such as the home, the office and the like. While potted plants can be simply placed on a floor, carpet or patio surface, such placement can cause a number of problems. For one thing, the potted plant can stain the underlying surface. Furthermore, crawling creatures such as snails, slugs and the like can easily gain access to potted plants when they are so positioned. Furthermore, it is often desirable to raise a potted plant above an underlyng surface in order to increase the aesthetic beauty of the plant by bringing it closer to eye level. It is sometimes also necessary to raise the level of a potted plant to increase the likelihood of sunlight reaching the plant in sufficient levels to assure that the plant will be sustained and remain attractive.

There are many prior art designs for plant stands which accomplish the principal purposes described above, but which unfortunately suffer from the disadvantage of being too complex and therefore too costly for the described function. The following U.S. Patents represent the most relevant known prior art.

1,001,416 Lloyd
1,006,328 Widenhofer
2,399,498 Messick
3,013,758 Smith
3,784,044 Bruggeman et al
3,863,875 Olson
4,025,012 Chan et al
4,083,457 Dromboski
4,215,514 Horowitz
4,534,130 Rogers
4,623,113 Studebaker
D 229,575 Dallas U.S. Pat. No. 3,013,758 to Smith is directed to a flower pot holder constructed from wire. The holder makes use of two members, "A" formed by relatively light bar material, the diameter of which is not specified, welded at right angles. A looped portion maintains the flower pot "P" above the ground level.

U.S. Pat. No. 1,001,416 to Lloyd is directed to a combined display stand and carrier for flower pots constructed from wire. Parallel bars and are secured together by article supporting members which receive and support the flower pots. However, the parallel supporting bars and are defined as heavy metal rods.

U.S. Pat. No. 4,534,130 to Rogers is directed to a wire mesh basket for carrying and displaying potted plants. As shown in FIG. 4b, each handle may be used as legs for supporting the basket above the floor surface for displaying plants.

U.S. Pat. No. 4,083,457 to Dromboski is directed to a bracket arrangement for supporting flower pots or similar articles. Although not formed from wire, the bracket arrangement shown in FIG. 6 support a flower pot is suspended by cord or chain.

U.S. Pat. No. 4,215,514 to Horowitz is directed to a suspended wire frame for supporting a plant. The frame is manufactured from a single length of wire having straight portions and a plurality of loops which form the support for the plant.

U.S. Pat. No. 3,863,875 to Olson is directed to a supporting frame for a table. The frame assembly is formed from two sets of leg frames disposed at right angles with respect to each other. Thus, four lengths of tubing are used to form the support.

Unfortunately, all of the aforementioned prior art relates to support structures for plants and the like which are more complex and therefore more costly than the present invention and therefore less likely to be commercially desirable for the use described herein.

SUMMARY OF THE INVENTION

The present inventions comprises a unique support structure for potted plants and the like which, in its preferred embodiment, is formed of two bent rigid wires joined at about their centers to form a spider-like configuration which provides a stable flat elevated surface upon which to mount a potted plant or the like and four legs each of which generally resists most crawling creatures such as snails and slugs from reaching the exterior of the potted plant. In addition, the present invention provides an elevated surface which prevents the bottom of the potted plant from staining the underlying surface upon which the support structure of the present invention is mounted. In its preferred embodiment, the present invention provides legs terminating in generally horizontally directed feet each of which may be placed within a plastic or hard rubber-like shoe. The shoes may be optionally used to increase the aesthetic appearance of the invention and to further reduce the possibility of any staining of the underlying surface. In the preferred embodiment of the invention, each of the bent rigid wires is made of 3/16 inch diameter steel and each is bent to provide a trapezoidally shaped elevated horizontal portion and a pair of diagonally directed downwardly formed opposed legs, spaced apart and terminating in generally horizontal feet. The elevated horizontally disposed trapezoidal portion is in the form of three sides of a trapezoid typically having equal length sides and a shorter central portion. The two bent rigid wire members forming a single unitary structure of the present invention are typically joined by affixing the abutting central portions such as by welding and the like so that the central portion of each such rigid wire member is joined to the other along what becomes the spine of the support structure. This spine, along with the two equal length sides of each trapezoid shaped portion, form a stable, horizontal platform supported by four diagonally directed legs which elevate the horizontal portions above the underlying surface and provide a firm stable support structure for an object such a potted plant. In the preferred embodiment of the invention, the resistance to snails is further increased by thinly plating the wire structure with copper, zinc, cadmium or alloys thereof which appear to further repel such annoying creatures. For purposes of this disclosure, thinly plated is defined as a plating thickness no greater than about four ten thousanthds of an inch and encompasses other forms of material coating such as painting, sputtering and vapor or chemical deposition.

OBJECTS OF THE INVENTION

It is therefore a principal object of the present invention to provide a simple and low cost support structure which may be used advantageously for supporting potted plants and the like in an elevated position above an underlying surface wherein the simplicity and low cost of the structure overcome or substantially reduce the noted disadvantages of the prior art.

It is an additional object of the present invention to provide a potted plant support structure comprising a pair of bent rigid wires affixed to one another along a central portion thereof and shaped to provide a stable elevated horizontal surface capable of withstanding a substantial weight and in turn supported by a plurality of generally vertical, diagonally directed legs which contact the underlying surface.

It is still an additional object of the present invention to provide a plant stand comprising two zinc, copper or cadmium plated bent rigid wire members, each shaped to provide half of a horizontally disposed support surface and a pair of space apart diagonally directed legs each terminating in a foot to which may be optionally attached a shoe for further enhancing the aesthetic appearance of the stand and for further reducing the likelihood of any staining or other damage to the underlying surface.

BRIEF DESCRIPTION OF THE DRAWINGS

The aforementioned objects and advantages of the present invention as well as additional objects and advantages thereof will be more fully understood hereinafter as a result of a detailed description of a preferred embodiment when taken in conjunction with the following drawings in which.

DETAILED DESCRIPTION OF A PREFERRED EMBODIMENT

Figure 1:
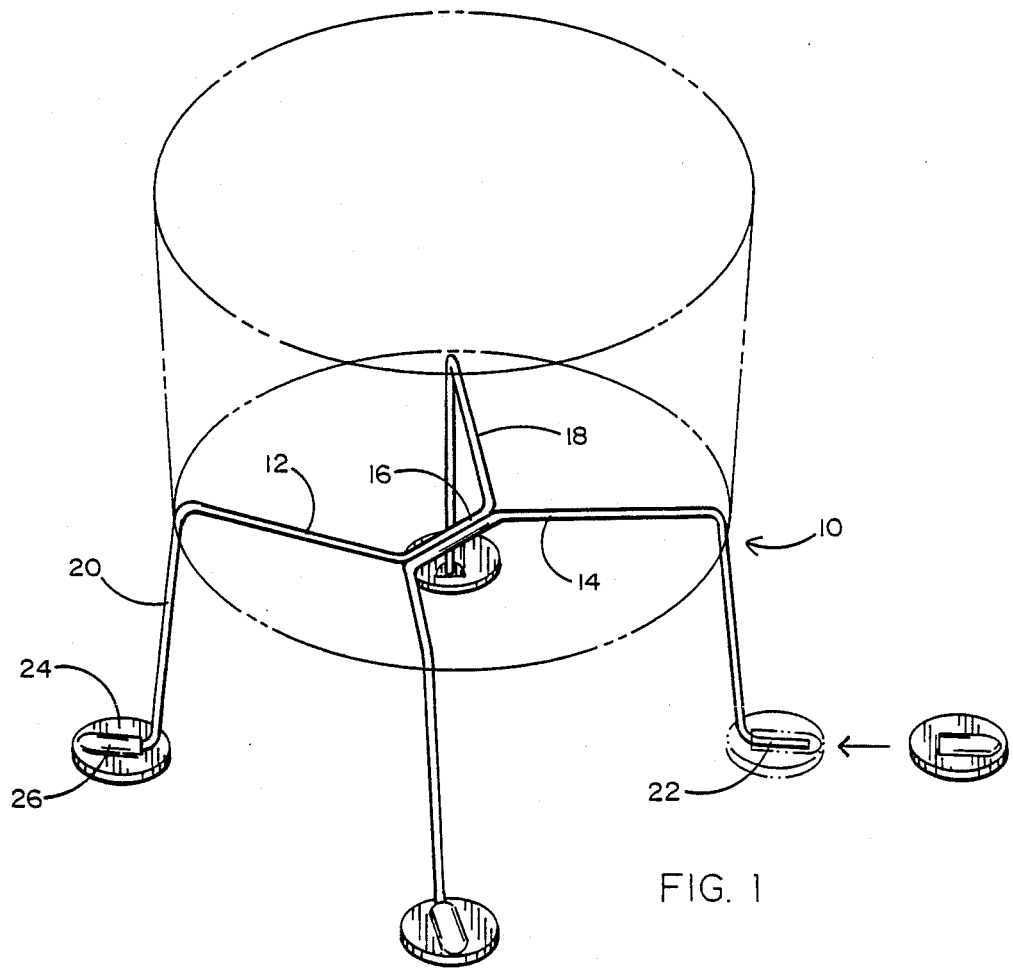
FIG. 1 is an isometric illustration of a preferred embodiment of the present invention.
Figures 2, 3:
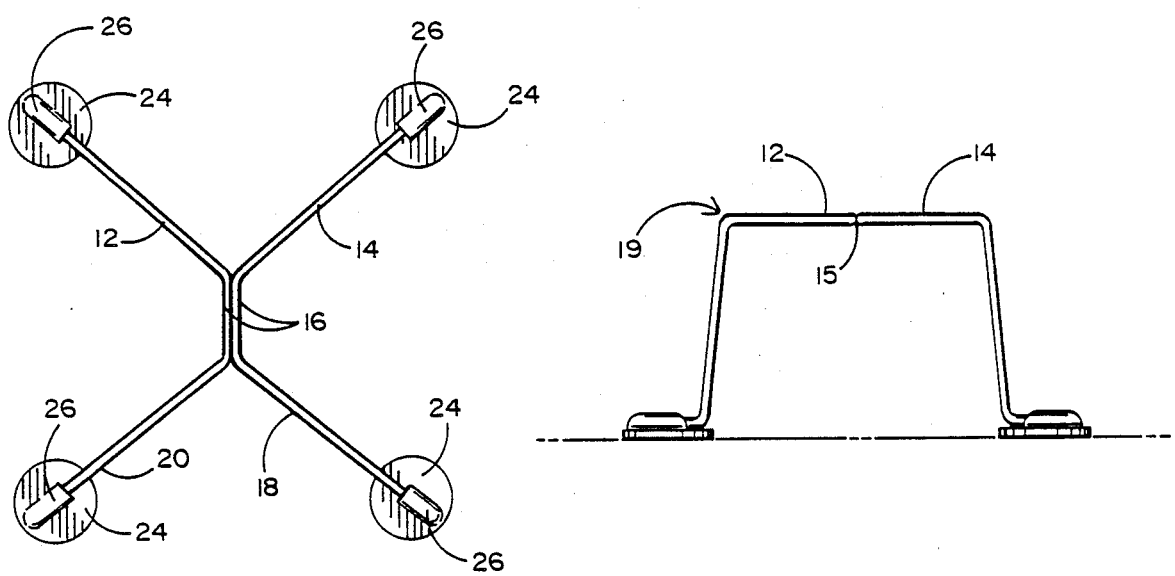
FIG. 2 is a top view of the present invention.
FIG. 3 is a front view of the present invention.

Referring now to FIGS. 1-3 it will be seen that the plant stand 10 of the present invention comprises a first rigid wire member 12 and a second rigid wire member 14 configured in symmetrical contiguous abutting relation at a joint 15. Each such wire member 12 and 14 comprises a central portion 16, a pair of angled portions 18, a pair of legs 20 and a pair of feet 22. It will be seen that the central portion 16 may be considered the top of a trapezoid and the angled portions 18 may be considered equal length sides of a trapezoid. Each angled portion 18 is, at its end opposite the central portion 16, gently turned through an angle of approximately 110 degrees to form a diagonally oriented leg 20 which extends in a general vertical direction toward the underlying surface. The lower end of each leg 20 is also gently turned at an angle of approximately 110 degrees to form a foot 22 which is substantially parallel to the underlying surface.

In the preferred embodiment of the invention illustrated in FIGS. 1-3, each foot is provided with a shoe 24 having a pocket 26 thereon for receiving the foot 22. Shoe 24 is a circular disk shaped member preferably made of a plastic or hard rubber-like compound for increasing the surface area and thus reducing the pressure of the weight of the plant stand 10 and any plant or other device supported by the stand. However, it will be understood that shoe 24 is an optional portion of the invention as feet 22 may be provided without a shoe 24 either in the short straight configuration shown in FIG. 1 or in other configurations such as curved or circular which would also have the effect of increasing the surface area of the foot.

In the preferred embodiment of the invention, each of the rigid wire members 12 and 14 is made of a 3/16 inch diameter steel wire which may be readily bent into the configuration shown herein by conventionally machinery, but when so bent by machinery, remains relatively rigid and resists further bending either manually or as a result of the weight of any device or potted plant that may be placed on stand 10. Also in the preferred embodiment, the joint 15, formed between adjacent central portions 16 of members 12 and 14, is formed by a bead of welding. However, those having skill in the art to which the present invention pertains will understand that a variety of alternative joining processes may be used to form the joint 15. By way of example, such a joint can be formed by soldering or metal-gluing or by placing a small rivet or screw through the central portion of the respective wire members 12 and 14.

Although the angled portions 18 of each wire member 12 and 14 are shown to be generally straight and lying in a horizontal supporting surface plane 19 in the accompanying figures, it will be understood that angled portions 18 may not necessarily be straight throughout their entire lengths. More specifically, it may be desirable to provide angled portions 18 with a slight rise, either throughout their entire length or only immediately adjacent the legs 20 in order to reduce the possibility of a device being inadvertently knocked off of the supporting surface plane 19. The steel wire members 12 and 14 are preferably plated with zinc, copper, cadmium or alloys thereof to further reduce the likelihood of snails climbing the stand to reach a plant thereon. When such plating is relatively thin, (i.e., no more than about four ten thousandths of an inch) an electrical voltage is produce by a snail's exterior fluids which tends to further repel such pests.

The actual dimensions of the plant stand of the present may, of course, be varied depending upon its particular application. In a preferred embodiment of the invention, the height between the top of feet 22 and the supporting surface plane 19 is in the range of 2½ to 12 inches and the overall length measured at the integral interface between the angled portions 19 and legs 20 of each rigid wire member 12 or 14 is 6 to 12 inches. However, it will be understood that the various dimensions defined herein may be varied by simply selecting different length rigid wire members and their bend points and angles and are not deemed to be limiting of the present invention.

It will now be understood that what has been disclosed herein comprises a novel plant stand or support structure for carrying an object such as a potted plant and specifically for holding such an object at an elevated position above an underlying surface. When used for supporting potted plants, the plant stand 10 of the present invention (especially when plated with zinc, copper or cadmium) is particularly advantageous for isolating the potted plant from crawling creatures such as slugs and snails which might otherwise crawl up the side of the potted plant and attack and destroy the plant. The thin wire structure of the present invention and particularly the thinly plated legs thereof, reduce the likelihood of such creatures crawling up and reaching the potted plant. An especially novel feature of the present invention is its simple and low cost construction being formed of two rigid wire members appropriately bent and joined to form a planar supporting surface elevated from and isolated from the underlying surface by a plurality of thin wire legs. In a preferred embodiment of the invention, the aforementioned rigid wired members are each shaped to provide the central portion and equal angular portions of a trapezoid. The angular portions terminate in gentle turns of approximately 110 degrees to form the generally vertical, diagonally directed legs. The legs, in turn, may be provided with feet formed at the lower ends of the legs. Each such foot may be optionally provided with a shoe having a pocket for receiving the foot and providing a larger surface area, reducing the pressure applied by the combined weight of the stand and object thereon on the underlying surface.

Those having skill in the art to which the present invention pertains will now, as a result of the applicant's disclosure herein, perceive various modifications and additions which may be made to the invention. By way of example, various modifications to the size and shape, as well as to the use of other materials and wire thicknesses for the basic structure will now be perceived. For example, the elevated surface could readily be provided with a triangular shape rather than a trapezoidal shape. However, all such modifications and additions are deemed to be within the scope of the invention which is to be limited only by the claims appended hereto.

I claim:

1. A support stand comprising:
   a pair of rigid wires, each such wire bent to form the top and sides of a horizontally disposed trapezoid, the trapezoid sides extending integrally into respective generally vertical legs, the respective trapezoid tops of said wires being affixed to each other to form a unitary member having a stable elevated support surface, wherein said affixed trapezoid tops form a centrally located portion of said elevated surface and said trapezoid sides form a plurality of diagonal portions of said elevated surface, each such diagonal portion extending radially from said centrally located portion.

2. The support stand recited in claim 1 wherein said wires are made of steel the surface of which is plated with a material taken from the group consisting of zinc, copper, cadmium, alloys of zinc and alloys of copper and alloys of cadmium.

3. The support stand recited in claim 2 wherein said plating material has a thickness which does not exceed about four ten thousandths of an inch.

4. The support stand recited in claim 1 wherein said trapezoid tops are affixed to one another in contiguous abutting relation by at least one common weld joint.

5. The support stand recited in claim 1 wherein said legs of said stand are coated with a layer of a dissimilar electrically conductive material the thickness of which does not exceed about four ten thousandths of an inch.

6. A support stand comprising:
   a pair of rigid wires, each such wire bent to form the top and sides of a horizontally disposed trapezoid, the trapezoid sides extending integrally into respective generally vertical legs, the respective trapezoid tops of said wires being affixed to each other to form a unitary member having a stable elevated support surface;
   further comprising a plurality of feet, each such foot extending from a respective one of said legs at an end of said leg opposite said elevated support surface.

7. The support stand recited in claim 5 further comprising a plurality of shoes, each such shoe being engaged with a respective one of said feet for increasing the surface area of said feet.

* * * * *